F. C. WILLIAMS
T. KILBURN
Inventors
By Moore and Hall
Attorneys

F. C. WILLIAMS
T. KILBURN
Inventors
By Moore and Hall
Attorneys

Jan. 15, 1957 F. C. WILLIAMS ET AL 2,777,971

INFORMATION STORAGE MEANS

Filed May 16, 1949 5 Sheets-Sheet 3

F. C. WILLIAMS AND T. KILBURN
Inventors

By Moore and Hall
Attorneys

F. C. WILLIAMS
T. KILBURN
*Inventors*

By Moore and Hall
*Attorneys*

Jan. 15, 1957 F. C. WILLIAMS ET AL 2,777,971

INFORMATION STORAGE MEANS

Filed May 16, 1949 5 Sheets-Sheet 5

F. C. WILLIAMS
T. KILBURN
*Inventors*

By Moore and Hall
*Attorneys*

United States Patent Office 2,777,971
Patented Jan. 15, 1957

2,777,971

INFORMATION STORAGE MEANS

Frederic Calland Williams, Timperley, and Tom Kilburn, Davyhulme, England, assignors, by mesne assignments, to International Business Machines Corporation, New York, N. Y., a corporation of New York Application May 16, 1949, Serial No. 93,612

Claims priority, application Great Britain May 22, 1948

37 Claims. (Cl. 315—12)

The present invention relates to the storage of information using apparatus of the type comprising a cathode ray tube having an electric charge-retaining screen, means for directing upon a surface of the screen a cathode ray beam of such velocity that the number of secondary electrons liberated is greater than the number of primary electrons arriving, scanning means for deflecting the beam whereby the beam scans the screen surface, means for controlling the beam in accordance with information to be stored in such a manner that there are produced at elemental areas on said surface electrostatic charge conditions representative of the information, a signal plate coupled capacitively to the said screen surface whereby when the beam is subsequently directed upon said elemental areas there are developed in the signal plate voltages representative of the said charge conditions, and a circuit for applying the said voltages to control the beam in such a manner as to regenerate the electrostatic charge conditions.

Such storage means are described in British Patents Nos. 645,691 and 657,591.

In particular the present invention relates to means for inserting (writing) or extracting (reading) information in or from said storage means and at the same time regenerating the charge pattern constituting the stored information.

According to the invention the scanning lines are explored sequentially and the sequential scanning is interrupted to scan a selected line. The sequential and selected lines may be scanned alternately. The selected line may be changed from time to time and in some cases may be explored only once and then changed to another selected line.

In the said copending applications reference is made to systems for storing information on the cathode ray tubes in the form of charge patterns on the screens. Such systems are used in digital computing apparatus. In a system of this kind, a "store" of information may comprise a number of lines each of which contains a "word" that is to say a number of digits representing according to the binary system of notation a numerical quantity. Information may be extracted from any line by exploring it with an electron beam, a process known as "reading" and during the "reading" process the information on the line is regenerated. Insertion of new information on a line, which may be done over old information is known as "writing."

In general use of these storage systems some lines would not be read or written for considerable periods but by use of the present invention all lines are explored at least once in a defined period.

The invention will now be described with reference to the accompanying drawings in which.

Figure 1:
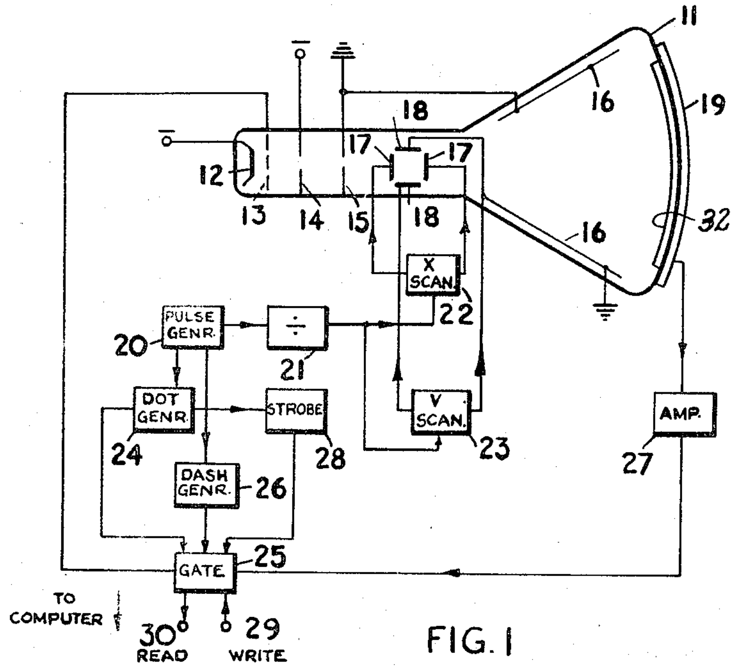
Fig. 1 shows a cathode ray tube storage unit.
Figure 2:
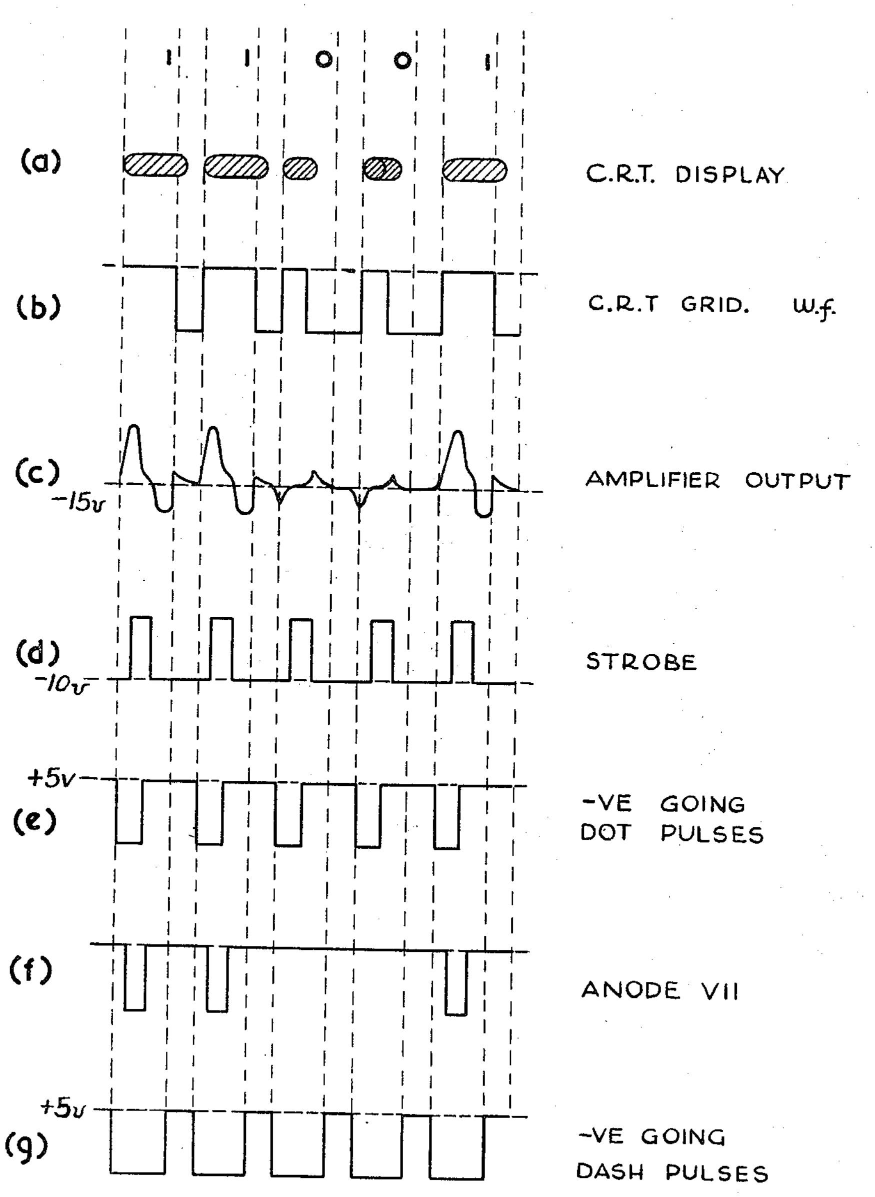
Fig. 2 shows waveforms illustrating the operation of circuits shown in Fig. 3.

Referring first to Fig. 1, reference numeral 11 denotes a cathode ray tube employed as a digit store as described in British Patent No. 657,591. Numbers in binary form are stored as pulses on each of thirty-two parallel lines on the cathode ray tube screen 32, the digit "0" being represented by a dot pulse and the digit "1" by a dash pulse. Each line contains pulses representing 32 such digits. A part of the display representing 11001 is shown in Fig. 2(*a*). The tube comprises a cathode 12, a control grid 13, a first anode 14, a second anode 15 and a third anode 16 constituted by a conducting coating on the inside wall of the tube adjacent to the screen and X and Y deflecting plates 17 and 18 respectively. The second and third anodes 15 and 16 are held at earth potential and the remaining electrodes have negative potentials applied to them to cause the tube to operate at a beam velocity such that when a spot on the screen is bombarded with electrons from the cathode the number of secondary electrons emitted from the spot exceeds the number of primary electrons which arrive. A signal pick-up electrode 19 is held securely on the outside wall of the tube adjacent to the screen.

A generator 20 of voltage pulses having a rectangular waveform produces regularly recurring pulses which are used to synchronise the operation of all the correlated parts of the apparatus. These pulses are fed to a divider circuit 21 which counts down to provide synchronising pulses for the X time-base generator 22 and the Y time-base generator 23 which provided deflection voltages which are applied to the X and Y deflector plates 17 and 18 respectively to set up a raster of 32 horizontal lines; between lines the electron beam of the cathode ray tube is blacked out. The particular form of Y scan employed, which is the subject of the present invention, is described in detail hereinafter. Each line is divided into 32 elements and during the scan of a line each element is normally illuminated by applying dot pulses from a dot pulse generator 24 through a gate circuit 25 (later to be described) to the control grid 13 of the cathode ray tube. The dot pulse generator 24 is synchronised by the pulse generator 20. However, an element can also be illuminated by applying to the cathode ray tube grid dash pulses obtained from a dash pulse generator 26 via the gate circuit 25. The dash pulse generator 26 is also synchronised by the pulse generator 20. The voltage waveform applied to the cathode ray tube grid to produce the display shown in Fig. 2(*a*) is shown in Fig. 2(*b*). The five pulses shown in Fig. 2(*b*) are thus in order, a dash pulse, a dash pulse, a dot pulse, a dot pulse and a dash pulse.

Reference to co-pending British patent application No. 26,584/47 will show that when an element of the cathode ray tube screen is illuminated during a scan, a transient pulse signal is generated in the pick-up electrode 19 having a sign dependent on whether a dot or dash is recorded on the element. If a dot is present a negative signal will be generated and if a dash is present a positive signal will be generated. The signals generated in the pick-up electrode 19 when the display is that shown in Fig. 2 (*a*) are shown in Fig. 2(*c*). The transient signals are used to regenerate the stored information in a manner now to be explained. Signals from the pick-up electrode 19 are amplified in an amplifier 27 and fed to the gate circuit 25. The gate circuit 25 is also fed with strobe pulses, shown in Fig. 2(*d*), obtained from a strobe pulse generator 28 and synchronised by the dot pulse generator 24. If a positive transient pulse signal, obtained by illuminating a dash pulse on the cathode ray tube screen, is fed to the gate circuit 25, the gate circuit operates to cause this dash pulse to be regenerated on the screen by applying a dash pulse from the dash pulse generator 26 to the cathode ray tube grid, otherwise a dot pulse from the dot pulse generator 24 will be applied to the cathode ray tube grid.

New information can be written on the cathode ray tube screen by applying signals to the gate circuit 25 via terminal 29. Output signals for a further part of the computer consisting of a dash pulse for each stored "1" digit may be read out from the gate circuit 25 via terminal 30.

Figure 3:
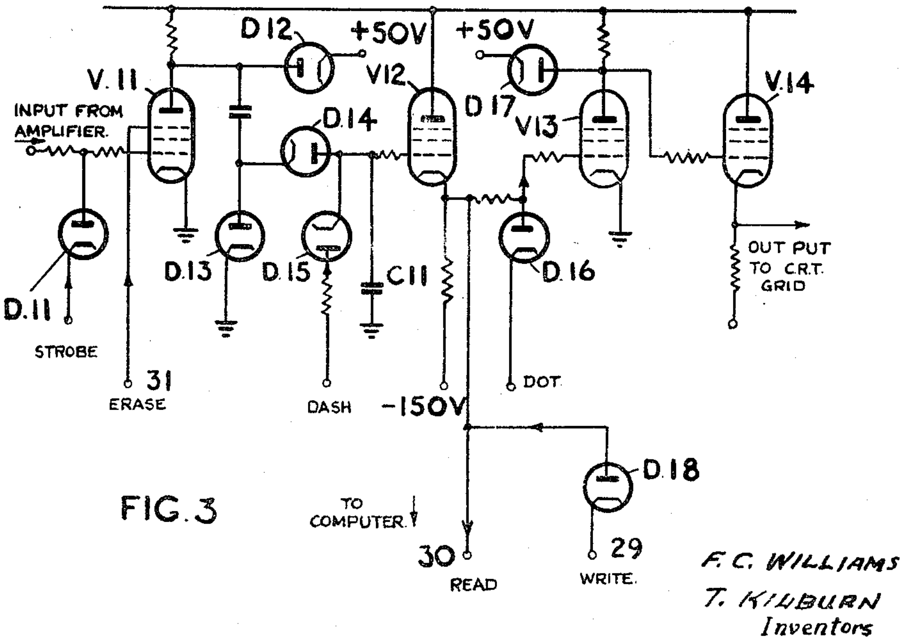
Fig. 3 shows the gate circuit 25 of the storage unit shown in Fig. 1.

The gate circuit 25 of Fig. 1 will now be described with reference to Fig. 3. Negative going dot pulses shown at Fig. 2(*e*), about a resting level of +5 volts are fed from the generator 24 of Fig. 1 via the diode D16 to the control grid of valve V13. During the pulse the anode current of valve V13 is cut off and the anode voltage rises until caught by the diode D17 at +50 volts. The resultant anode voltage is fed to the control grid of a cathode follower valve V14 and the output voltage across the cathode load resistance of this valve is fed to the control grid 13 of the cathode ray tube to produce a standard display of dots.

In response to the detection of a positive pulse from the amplifier 27 of Fig. 1 due to the detection of a dash pulse on the cathode ray tube screen the portion of the gate circuit comprising valves V11 and V12 operates to extend the dot pulse on the control grid of valve V13 into a dash pulse. The output voltage of the amplifier (Fig. 2(*c*)), biased to −15 volts is fed to the control grid of valve V11 together with the strobe pulses (Fig. 2(*d*)), which are from a resting level of −10 volts. The anode current of the valve V11 is normally cut off and is cut on only when a positive amplifier pulse coincides with a positive strobe pulse. A negative pulse is thus produced at the anode of the valve in response to a positive pulse from the amplifier due to the detection of a dash pulse on the cathode ray tube screen. The output voltage at the anode of the valve V11 due to the display shown in Fig. 2(*a*) is shown in Fig. 2(*f*). The voltage at the anode of valve V11 is fed in turn to the control grid of a cathode follower valve V12 which has its upper control grid voltage defined at zero volts by conduction of the diodes D14 and D13 and the lower grid voltage limit defined at −15 volts by conduction of the diode D15. Negative-going dash pulses, shown in Fig. 2(*g*) are also fed to the control grid of the valve V12 about a resting level of +5 volts via the diode D15. The condenser C11 prevents the voltage on the control grid of valve V12 changing unless it is driven. The grid will therefore remain at −15 volts for the duration of the dash interval, mainly the negative-going part of the waveform shown in Fig. 2(*g*). At the positive-going trailing edge of the dash waveform the grid V12 will be driven to 0 volts and will remain there until it receives another negative pulse from the anode of the valve V11. The voltage across the cathode load of the valve V12 is fed to the control grid of the valve V13 which is also being fed with dot pulses via diode D16. If, due to the detection of a dash pulse on the cathode ray tube screen a negative pulse is produced across the cathode load resistance of valve V12, the grid of valve V13 willl be initially cut off by the dot waveform and held off for a dash period, the valve V13 thus reproducing a voltage having the dash waveform at its anode. Otherwise a dot pulse will be reproduced at the anode of valve V13.

A convenient read output from the storage unit is derived from the cathode of the valve V12 via terminal 30 and it takes the form of a negative pulse for each stored dash pulse on the cathode ray tube screen i. e. for each stored "1" digit. External information represented in this manner can be written in the storage unit by applying it to the control grid of the valve V13 via terminal 29 and diode D18. Each such negative pulse applied to terminal 29 extends a dot into a dash. When writing new information over old information it may also be necessary to convert a dash pulse on the cathode ray tube screen into a dot pulse. This is achieved by applying a negative pulse to the suppressor grid of valve V11 via terminal 31 which cuts off the anode current of this valve thereby breaking the regenerative loop and allowing completely new information to be inserted via terminal 29 and the diode D18. Blackout of the X-time base recovery sweeps is provided by inhibiting dot, dash and strobe pulses at their source during the black out period.

Figure 4:
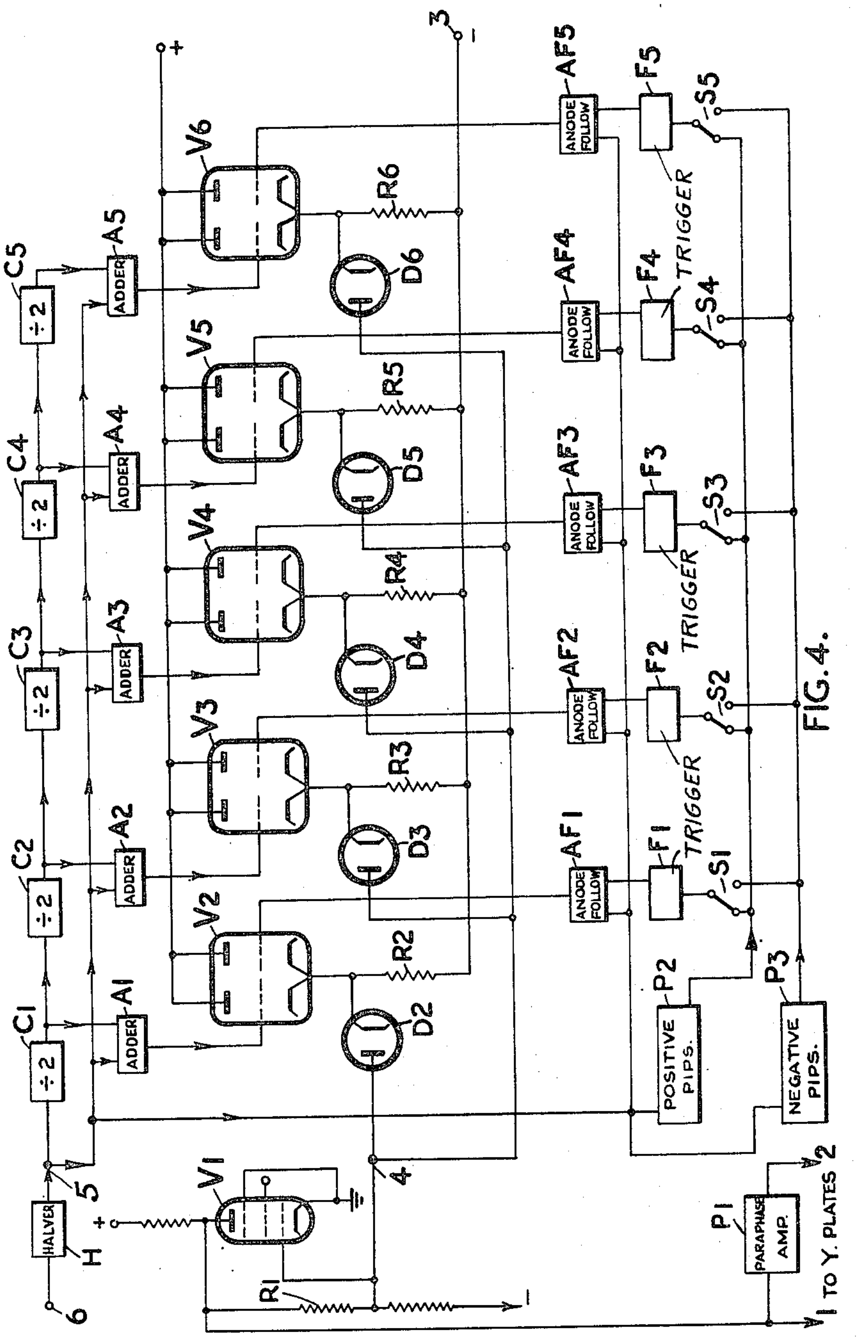
Fig. 4 shows the Y scan unit 23 of the storage shown in Fig. 1.

The Y time base generator shown at 23 in Fig. 1 will now be described with reference to Fig. 4. It is designed to provide a Y-scan divided into 32 voltages steps corresponding to the 32 lines of a raster and to provide a facility whereby any selected line of the raster can be scanned during each step in the raster scan.

The arrangement shown comprises an output resistance R1 connected between control grid and anode of a pentode valve V1 from the anode end of which the Y-scan voltage is taken to output lead 1. A paraphase amplifier P1 provides the paraphase scan voltage through lead 2. Because of the negative feedback produced by the connection of R1 between the anode and the control grid, the potential of this grid will remain nearly at earth potential. The current in resistance R1 will therefore determine the anode voltage and hence the Y-scan voltage. The current through R1 is made to vary in steps in the desired manner by means of a plurality of parallel current paths each comprising a diode valve and a resistor. These paths are constituted by diodes D2, D3 . . . D6 and resistors R2, R3 . . . R6 and provide connection from a source of negative voltage 3 to a common lead 4 connected to the grid of valve V1. Changes of potential of this grid will affect the linearity of the Y-scan voltage, but such changes as occur are small compared with the negative voltage from 3, and may be neglected.

Conductivity of the diodes D2 . . . D6 is controlled by means of double triode valves V2, V3 . . . V6. The resistors R2 . . . R6 are connected to the cathodes of the respective valves V2 . . . V6. It will thus be seen that when any given valve of this group is conducting, the voltage of its cathode will be raised by the current flow in the corresponding cathode resistor. The cathode voltage of the corresponding diode will likewise be raised so that the diode will be rendered non-conductive and no current will be supplied therethrough to the output resistor R1. It will be obvious that either of the two halves of a double triode valve of the group V2 . . . V6 when conductive, will have the same effect, so that the two grids of the parallel triode portions constitute two means by which control may be exercised on the relative diode circuit.

Figure 5:
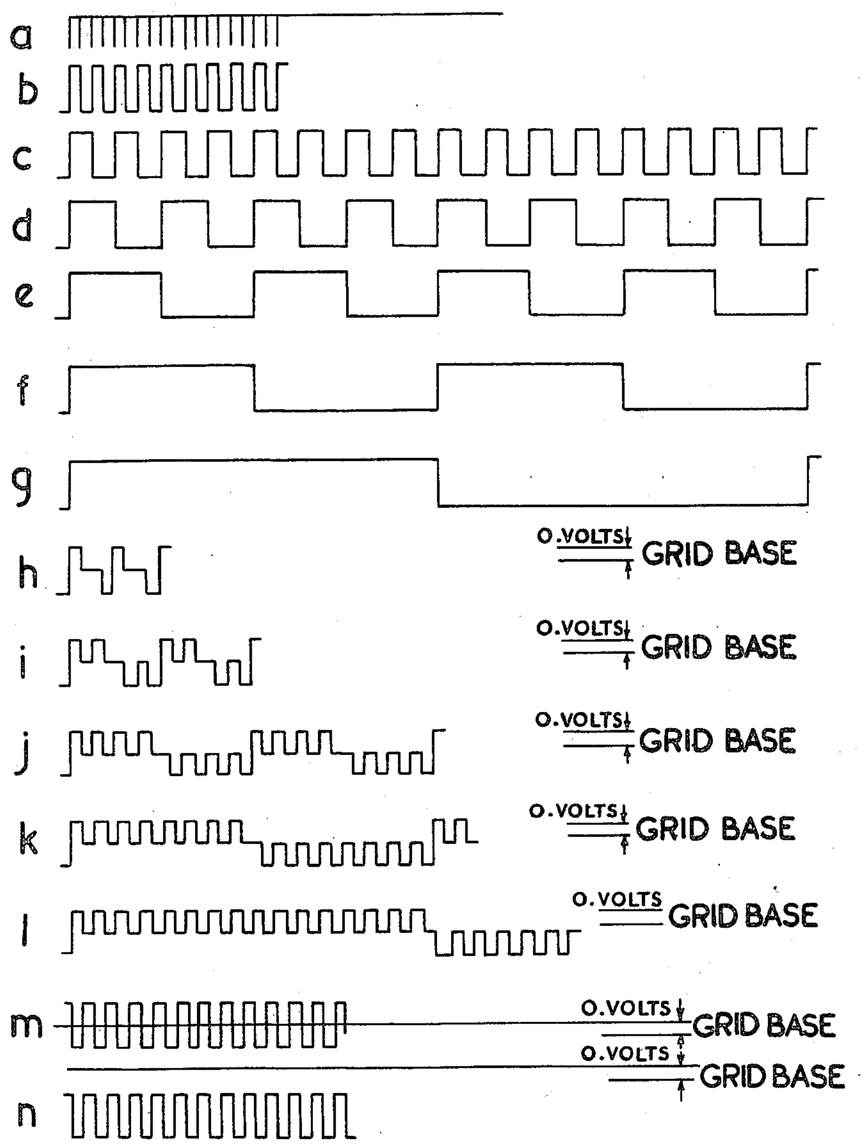
Figs. 5, 6 and 7 shows waveforms illustrating the operation of the Y scan unit shown in Fig. 4.

The control influencing all the left hand triode portions of valves V2 . . . V6 will first be considered. For this purpose a plurality of counter circuits C1 . . . C5 is provided, each counter being a scale-of-two circuit counting down from the previous counter. To the counter circuits C1 . . . C5 there are applied, through lead 5, impulses from divider circuit 21 of Fig. 1 and at a repetition rate corresponding to the switching speed required for the Y-scan. These impulses are fed in through terminal 6 and a halving circuit H. The original impulses on terminal 6 are of the form shown in Figure 5(*a*); the output from the halver circuit H is shown at Figure 5(*b*). It will be apparent that the outputs from the counter circuits C1 . . . C5 will be as represented respectively by the waveforms shown at Figures 5(*c*) to (*g*).

If now the operation of halver circuit H on the system as a whole is ignored, the operation of the system as so far described, will be as follows. Assuming that the right hand triode portions of valve V2 . . . V6 are maintained non-conducting continuously, the sequence of operation of the left hand triode portions to the control grids of which the waveforms of Figures 5(*a*) to (*g*) are applied, may be deduced by inspection from these waveforms. Thus, regarding the castellated waveform of Figure 5(*c*) as dividing the total time into elemental periods, during the first period all the triodes will have their grids raised in potential and will, therefore, conduct, thus rendering all the current paths provided by diodes D2 . . . D6 and R2 . . . R6 ineffective. The anode of V1 will therefore be maintained at its least positive value. The Y-scan will therefore commence at its most positive value at the terminal 2 in Figure 4 and at its most negative value at the terminal 1. It should be noted that the waveforms of Figures 6 and 7 relate to voltages at the terminal 2 in Figure 4. In the next elemental period the left hand triode of V2 will be rendered non-conductive so that diode D2 will conduct and current will flow through resistor R2 to resistor R1 raising the voltage on the anode of V1. The value of resistor R2 is such that a step of the desired magnitude is produced in the Y-scan voltage.

It should at this stage be pointed out that the resistors R2, R3 . . . R6 will be graded in value according to the formula $R_n=R_2/2^{n-2}$, where $n$ is the subscript numeral of the reference to a resistance. The currents through these resistors when the triodes are cut-off, therefore, will be in the proportions 1, 2, 4, 8, 16, 32. If, therefore, the current paths provided by these resistors are brought into service in the correct sequence, a voltage step such as that produced by the switching of triode V2 can be produced at each stage. Further inspection of Figures 5(*c*) to (*g*) will demonstrate that this result is achieved by the arrangement shown. Thus in the third elemental period V2 is again switched on while V3 is switched off, so that the circuit through R3 becomes effective. The effective current to R1 is, therefore, changed from unit value to double this value. In the fourth elemental period, valves V2 and V3 become non-conductive so that the current path through resistor R2 is switched on in parallel with R3 thus raising the total current to three times unity value. The sequence of events will be seen to progress in this way so that a continuous succession of voltage steps representing the desired Y-scan will be generated, the waveform being that shown at Figure 6.

The arrangement operating as above described would be suitable for any raster scan which requires straightforward line by line scanning. As has been mentioned above, however, it is desired to scan a selected line in the raster. Obviously this could be achieved in the arrangement shown by selecting the appropriate combination of valves V2 . . . V6 to be rendered non-conductive. This could be done by operating on the right hand triode portions of these valves, provided the left hand portions were all rendered non-conductive. If for example with the convention that the first line in the raster is called line 0, it is desired to scan line 21, then V3 and V5 are made to conduct and V2, V4 and V5 are cut-off. Only the diodes D2, D4 and D6 conduct and a Y shift of 21 ($2^0+2^2+2^4$) units is produced. It will be observed that the line chosen by operating on the right hand triode portions and the corresponding line of the raster produced by the left hand triode portions are accurately the same, since they both depend on the resistances R2 . . . R6 and not the triodes involved.

However in accordance with this invention the Y time hose generator is arranged to scan any selected line during a raster scan, without waiting for it to be reached during the normal course of events.

To this end, in the arrangement shown, the raster operation is divided into two phases which may be called the "scan" and "action" beats controlled by waveforms applied to the grids of the left hand and right hand triode portions of valves V2 . . . V6 respectively.

During the scan phase, the raster lines are scanned sequentially with the sole object of regenerating the stored information. During the action phase a selected line will be scanned. The scan and action beats occur alternately and each occupies one half of each elemental period above referred to.

Figure 7:
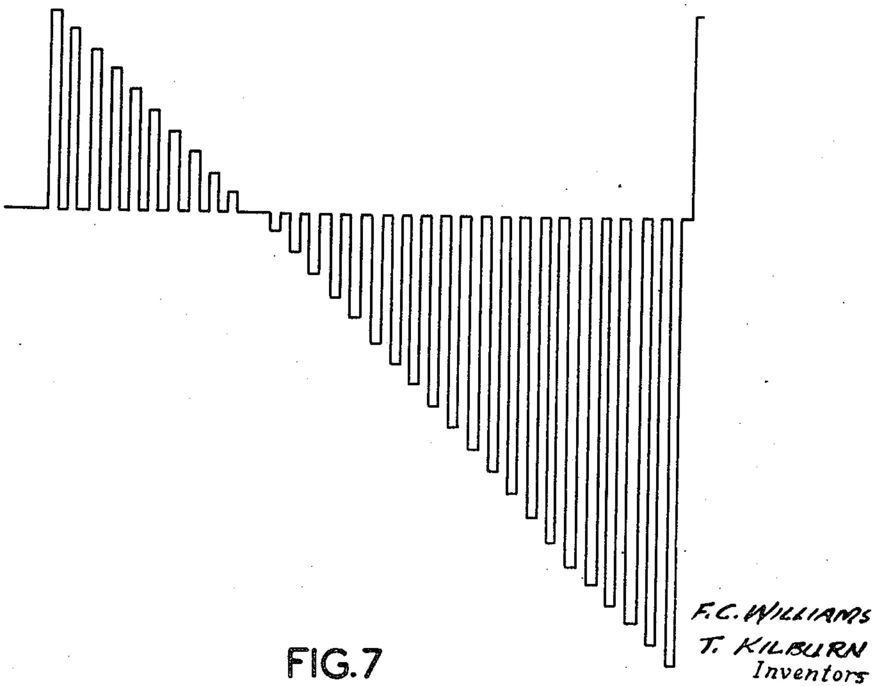

If the Y-scan waveform is to comply with such a programme it will be of the form shown in Figure 7 providing sequential scanning of the raster lines 0, 1, 2 and so on, interspersed by the required action line in this example line 10. In this example, it has been assumed that no change of selected line has been effected during the raster scanning period.

To this end, as above described, the input pulses first operate upon the halver circuit H, which in turn triggers the five-stage scale-of-two counter system comprising the counters $C_1$ . . . $C_5$. The waveform of the output from halver H is shown in Figure 5(*b*). The halver circuit is itself, therefore, a scale of two counter. The halver waveform is added to each of the counter waveform in the adding circuits $A_1$ . . . $A_5$, and the resulting waveforms are as shown in Figures 5(*h*) to (*l*). These voltage waveforms are D. C. restored to earth potential, and are applied to the grids of the left hand triodes. The greatest voltage achieved by any of the waveforms (*h*) to (*l*) is zero volts. Further, the waveforms have sufficient amplitude to prevent current flowing in the left hand triodes except during those half cycles of the halver waveform during which they are at zero volts. Now if it is assumed for the moment that the potentials applied to the right hand triodes are sufficiently negative to prevent current flowing in them, it will be seen that during the first scan period, current flows in all the left hand triodes, so that the diodes $D_2$ . . . $D_6$ do not conduct, the Y shift is zero and the electron beam of the C. R. T. scans line 0. During the first action period no current flows in any left hand triode so that all the diodes conduct, the Y shift is at its maximum value and line 31 is selected. During the second scan period only $D_2$ conducts, so that unit shift occurs and line 1 is scanned. But during the following action period all the diodes conduct again, so that line 31 is again selected. It will be clear from such considerations that the whole raster of 32 lines will be scanned sequentially, line 31 being the action line between scans of adjacent lines.

Figure 6:
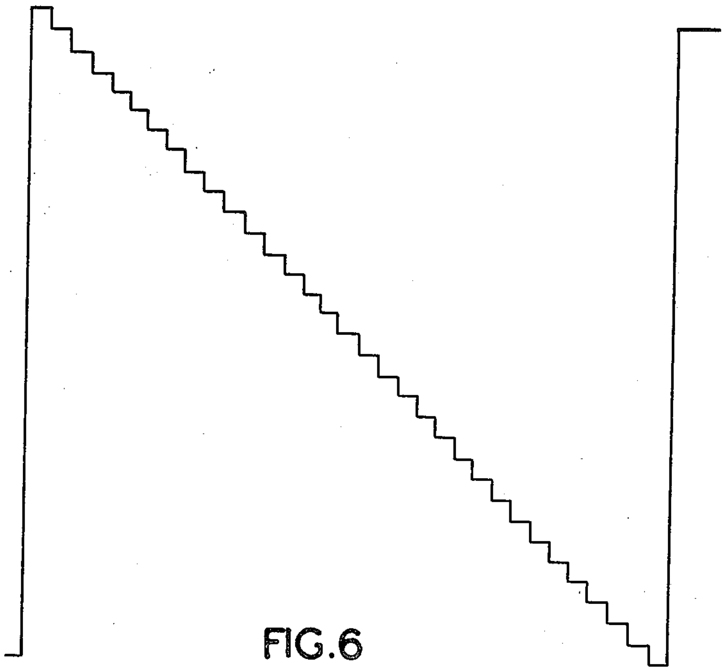

Now, in order to select any given line to be scanned during the action periods, in place of line 31, it is necessary to ensure that during these periods the appropriate right hand triode portions are made to conduct by the application of suitable bias potentials to their control grids during these periods. To select line 10, for example, requires a shift of 10 units during the action periods only, so that during these periods V2, V4 and $V_6$ must conduct and V3 and $V_5$ not conduct. The appropriate voltages to achieve this result are obtained in the arrangement shown, from the circuits $AF_1$ . . . $AF_5$ which may be so called anode follower or see-saw circuits, which serve to supply either the halver circuit output waveform (Figure 5(*b*)) or a negative cut-off bias, as determined by the associated flip-flop or trigger circuits $F_1$ . . . $F_5$ to the appropriate valve grids. The flip-flop circuits $F_1$ . . . $F_5$, which may be multivibrator circuits with two stable states, are triggered into the appropriate condition of stability by means of impulses supplied to them through switches $S_1$ . . . $S_5$ each of which may be set to the appropriate position to set up the combination required for the line to be selected. The waveform thus selected for the grids of the right hand triodes are those shown at Figures 5(*m*) and (*n*). It will be seen that the waveform of Figure 5(*n*) lies wholly beneath the grid cut-off voltage for valves $V_2$ . . . $V_6$ and will serve as a suitable cut-off bias for these valves when applied thereto. If the waveform shown at Figure 5(*m*) is used for $V_2$, $V_4$ and $V_6$ and that at Figure 5(*n*) for $V_3$ and $V_5$ line 10 will be selected. It will be seen that for these waveforms the opposite phase of the halver output to the one for triggering the counter circuits is used and is arranged alternately to turn on and cut off current in the right hand triodes $V_2$, $V_4$ and $V_6$ while maintaining $V_3$ and $V_5$ cut off, during one half of each elemental period of the scan. One cycle of the shift waveform under these conditions is shown in Figure 6.

In order to change the selected line, the waveforms of Figures 5(*m*) and (*n*) must be applied to different combinations of valves $V_2 \ldots V_6$. This may be done by changing over the appropriate switches $S_1 \ldots S_5$. However, these voltages must not be changed during an action period, because if they are, a diagonal line will be traced across the cathode ray tube screen by the electron beam, and stored information will be wiped out. They may, however, be changed at any time during a scan period, since they only affect the right hand triodes which play no part in the operation during a scan period. It is convenient to arrange that a change in voltage can only occur at the beginning of the scan period immediately following the throw of a switch. To achieve this, either positive or negative pips derived by differentiation of the halver waveform only derived from circuits P2 and P3 respectively and which occur at the beginning of scan periods, are applied to the input grids of five flip-flop circuits $F_1 \ldots F_5$ by means of the switches $S_1 \ldots S_5$. When a switch is thrown, the corresponding flip-flop cannot change its state until it receives a pip. This ensures that change of state can never occur during an action period. The positive or negative voltages produced by the flip-flops are added to the halver waveform by the anode followers $AF_1 \ldots AF_5$ to produce the waveforms at Figures 5(*m*) and (*n*). A description of the anode follower circuits $AF_1 \ldots AF_5$ is not necessary to the understanding of this invention but a description of the anode follower circuit may be found in "Introduction to Circuit Techniques for Radioduction" by F. C. Williams: Journal I. E. E., 1946, 93, part IIIA, p. 303 (see sections 9.2–9.4).

To summarise, the circuit causes a scan of a 32 line raster to be performed, and the action line of the raster can be selected by a suitable choice of the positions of the five switches $S_1 \ldots S_5$. Obviously switches may be replaced by five leads via which either a positive or a zero pulse may be fed to the flip-flops in order to set up the required switching sequence in order that the apparatus may be controlled from some other part of a digital computor. If a special case is considered, in which the instruction is to read line 19, positive pulses will be sent to flip-flops 1, 2 and 5 only. At the beginning of each scan period, all the flip-flops will be set into a standard condition by negative pulses. In such cases the flip-flops may be set up during a scan beat so that the next action beat is on a new selected line. This effect may be produced at some or all scan beats so that in general the sequence of exploration will be such that the lines of the store are explored in scan beats sequentially and the scan beats occur alternately with action beats during which selected lines (which may or may not change from action beat to action beat) are explored.

We claim:

1. A method of writing information into or reading information from a cathode ray tube storage means in which the information is stored on a raster of lines, comprising the steps of exploring said lines in a predetermined sequence and exploring a selected one of said lines in alternation with each step of said predetermined sequence.

2. A method according to claim 1, comprising the step of exploring a different selected one of said lines from time to time.

3. Apparatus for generating stepped voltage waveforms comprising an output impedance across which a voltage of the desired waveform is to be set up, a plurality of parallel current paths for supplying current to said impedance to set up a voltage across it, each of said paths including an impedance chosen to limit the current supplied through the respective path and a unilaterally conductive device adapted to conduct only in the direction appropriate to increase the current flowing in said output impedance, and means for rendering said paths operative selectively to supply current to said output impedance in a predetermined sequence embracing selected combinations of said parallel paths to vary the current in said output impedance in the appropriate steps to generate the desired voltage waveform therein, said means comprising at least one thermionic valve associated with each said unilaterally conductive device, said device being connected to an electrode of said valve, and means for varying the current through said thermionic valve to vary the voltage applied thereto to the one of said unilaterally conductive devices connected thereto between a value adequate to inhibit current flow in the last-named device and a value at which the last-named device conducts.

4. Apparatus as claimed in claim 3 wherein the unilaterally conductive device comprises a diode having its cathode connected to the cathode of said thermionic valve and wherein the current limiting impedance for the respective current path comprises a resistance forming a common cathode load for said thermionic valve and said unilaterally conductive device.

5. Apparatus as claimed in claim 4, wherein the current limiting impedances in a group of said parallel current paths are graded in value in geometric progression to the power of 2 and wherein said means for rendering said current paths operative are constituted to provide a progressive increase in the total current supplied through said output impedance.

6. Apparatus as claimed in claim 5, comprising regulating means for applying appropriate regulating voltages to selected thermionic valves of a group of such valves to render said current paths operative in the desired sequence.

7. Apparatus as claimed in claim 6 wherein said regulating means comprise means for generating a series of controlling impulses at a repetition frequency related to that required for the individual steps in the output waveform, a plurality of scale-of-two counting circuits for deriving switching voltages from said impulses, and means for applying said switching voltages as the said regulating voltages to the thermionic valves controlling the respective current paths.

8. Apparatus as claimed in claim 7 comprising means for setting up static control voltages adapted to render selected valves of a further group of said valves operative to select a given combination of current paths to supply the appropriate current to said output resistance corresponding to any desired step in the output voltage waveform.

9. Apparatus as claimed in claim 8 comprising means for rendering the static control voltages operative at selected times alternatively to said switching voltages.

10. Apparatus as claimed in claim 9 comprising means operated by said controlling impulses for rendering said static control voltages operative during a part of the time allotted to each step in the output voltage.

11. Apparatus as claimed in claim 10 comprising means for rendering a change in the static control voltages set up at any given time effective only at given times in the switching sequence.

12. Electrical information storage means, comprising an evacuated envelope, an insulating recording surface contained in said evacuated envelope, means for producing an electron beam at a velocity such that, when the beam strikes the surface, the number of secondary electrons liberated is greater than the number of primary electrons arriving, beam deflecting means, a time base circuit feeding said beam deflecting means to cause said beam to scan a raster of a number of parallel lines on said surface and to cause said lines to be explored sequentially but alternately with selected lines, modulating means for modulating the intensity of said beam in accordance with information to be stored, to give rise to a charge pattern on said insulating surface corresponding to the information to be stored, signal pick up means comprising means associated with said surface for detecting changes in the charge on said surface means for extracting from said pick-up means the initial transient arising in the subsequent exploration of each element of the charge pattern, and means for causing the extracted transient to operate said modulating means to regenerate the charge pattern.

13. In a digital computing system in which digital information is stored in a raster of lines, each line containing a plurality of digits, the method of reading information from the store which comprises exploring said lines in a predetermined recurrent sequence but alternately with a selected one of said lines.

14. In a digital computing system in which digital information is stored in the form of an electrostatic charge pattern on an insulating surface, the charge pattern comprising a raster consisting of a plurality of rows each containing a plurality of spaced, charged areas, the method of reading information from the store which comprises exploring said rows with a cathode ray beam in a predetermined recurrent sequence but alternately with a selected one of said rows.

15. In a digital computing system in which digital information is stored in a raster of lines, each line containing a plurality of digits, the method of regenerating the stored information and of reading information from and writing new information into a selected line which comprises exploring the lines sequentially to regenerate the stored information and interrupting the sequential exploration to explore a selected line.

16. Electrical information storage means comprising a cathode ray tube, an electric charge-retaining recording surface in said tube, an electron gun in said tube producing a beam of electrons bombarding said surface, control means between said electron gun and said recording surface directing the movement of said beam in lines upon said surface, and scan means coupled to said control means and causing said beam to explore said lines sequentially, auxiliary means coupled to said tube to cause said beam to scan a selected part of said surface, a control circuit coupled to said auxiliary means to vary the part of said surface selected for scanning, and further means operable to render said auxiliary means operative and said scan means inoperative, and to render said auxiliary means inoperative and said scan means operative.

17. The apparatus of claim 16 in which said scan means comprises an output impedance, a plurality of current paths coupled to said impedance, means selectively controlling the flow of current in each of said plurality of current paths to vary the total current flowing through said impedance in a predetermined manner, and means coupling said output impedance to said control means.

18. The apparatus of claim 17 in which each of said current paths includes a unilaterally conductive device.

19. The apparatus of claim 18 in which said means selectively controlling the flow in said current paths comprises potential producing means coupled to said unilaterally conductive device, said potential producing means variably biasing said unilaterally conductive device in a predetermined law.

20. The apparatus of claim 18 in which said unilaterally conductive device is a diode, said potential producing means being coupled to one element of said diode.

21. Electrical information storage means comprising a cathode ray tube, an electric charge-retaining recording surface in said tube, for storing a plurality of informations, in the form of electrical charges, in a raster of lines, an electron gun in said tube producing a beam of electrons bombarding said surface, control means adjacent the path of said beam and controlling the movement of said beam, scan means coupled to said control means and causing said beam to sweep said lines in a predetermined pattern, said scan means including an output impedance coupled to said control means, a plurality of current paths coupled in parallel to said impedance, and switch means controlling the current flow in each of said paths.

22. The apparatus of claim 21 in which each of said current paths includes a current limiting device, said current limiting devices limiting the maximum current flow in each of said paths excepting one to a power of 2 times the current flow in said one path.

23. The apparatus of claim 21 in which each of said current paths includes a unilaterally conductive device, said switch means comprising potential producing means coupled to each of said conductive devices to vary the bias thereon.

24. The apparatus of claim 23 in which said potential producing means includes a group of thermionic valves each having a load impedance, means respectively coupling said load impedances to each of said unilaterally conductive devices, and means selectively controlling the current flow through preselected combinations of said thermionic valves and load impedances to thereby vary the bias on preselected combinations of said unilaterally conductive devices.

25. The method of storing information and subsequently reading information so stored which comprises bombarding an insulating surface with an electron beam, sweeping said beam across said surface in a plurality of substantially parallel and sequential lines, modulating said beam while sweeping said surface in said sequential manner, and interrupting said sequential sweeping to sweep a selected line.

26. In a storage system in which digital information is stored electrostatically in a plurality of elemental areas on a storage surface, the method of operation comprising the steps of scanning the said elemental areas recurrently in a predetermined sequence, and interrupting the scanning to scan selected ones of said elemental areas.

27. In a storage system comprising a cathode ray tube, an electrostatic storage member within the said tube, means for directing upon a surface of the said storage member a cathode ray beam of such velocity that the number of secondary electrons liberated is greater than the number of primary electrons arriving at the said surface, scanning means to deflect the beam over said surface, means to control the beam in accordance with information to be stored to produce at elemental areas on said surface electrostatic charge conditions representative of the said information, a singal plate coupled to the said surface having voltages selectively developed therein representative of said charge conditions, auxiliary means coupled to said tube to cause said beam to scan a selected part of said surface, a control circuit coupled to said auxiliary means to vary the part of the said surface selected for scanning, and further means operable to render said auxiliary means operative and said scanning means inoperative, and to render said auxiliary means inoperative and said scanning means operative.

28. A system as claimed in claim 27, wherein said scanning means comprise a time base circuit to generate a recurrent series of voltages which deflect the cathode ray beam in steps in one co-ordinate.

29. A system as claimed in claim 27, wherein said scanning means comprise a time-base circuit to generate a recurrent series of voltages which deflect the cathode ray beam in steps in one co-ordinate, said auxiliary means comprising switching means to select any one of the said series of voltages for application to deflect the cathode ray beam, said control circuit providing control voltages for selectively actuating said switching means, said further means comprising a generator of switching signals rendering said scanning means and said auxiliary means operative alternately.

30. A system according to claim 29, wherein said time-base circuit comprises an output impedance across which the series of voltages is set up, a plurality of parallel current paths coupled to said impedance to set up a potential across it, each of said paths including an impedance chosen to limit the current supplied through the respective path, and means to render at least one of said paths operative to supply current to said output impedance in a predetermined sequence embracing selected combinations of said parallel paths to vary the current in said output impedance in desired steps.

31. A system according to claim 29, wherein said time-base circuit comprises an output impedance across which the series of voltages is set up, a plurality of parallel current paths for supplying current to said impedance to set up a potential across it, each of said paths including an impedance limiting the current supplied through the respective path and means rendering at least one of said paths operative to supply current to said output impedance in a predetermined sequence, embracing selected combinations of said parallel paths, to vary the current in said output impedance in steps appropriate to generate across the impedance the said series of voltages, each of said parallel paths including a unilateral conductive device arranged to conduct only in the direction appropriate to increase the current flowing in said output impedance.

32. A system according to claim 29, wherein said time-base circuit comprises an output impedance across which the series of voltages is set up, a plurality of parallel current paths for supplying current to said impedance to set up a potential across it, each of said paths including an impedance chosen to limit the current supplied through the respective path and means to render at least one of said paths operative to supply current to said output impedance in a predetermined sequence embracing selected combinations of said parallel paths to vary the current in said output impedance in the steps appropriate to generate across the impedance the said series of voltages, each of said parallel paths including a unilateral conductive device arranged to conduct only in the direction appropriate to increase the current flowing in said output impedance, and bias means applying to said unilateral conductive device a bias potential adequate to inhibit current flowing therein and removing said bias potential when said device is required to conduct.

33. A system according to claim 32, wherein said bias means comprises at least one thermionic valve to electrodes of which said unilateral conductive device is coupled and means controlling the current through said thermionic valve to control the bias potential applied thereby to said unilateral conductive device.

34. In the method of writing information into or reading information from the store in a storage system in which digital information is stored in a raster of lines, which comprises the steps of exploring the said lines sequentially, and of interrupting the sequential exploration to explore a selected line.

35. The method of writing information into or reading information from storage means including a storage member capable of storing information on elemental areas thereof, comprising the steps of exploring said elemental areas in a predetermined sequence and exploring at least one selected elemental area in alternation with each step of said predetermined sequence.

36. A method of writing information into or reading information from a cathode ray storage tube comprising the steps of, sweeping the screen of said tube to write or read information on elemental areas thereof, scanning said elemental areas of the screen in a predetermined sequence, at least one selected elemental area so scanned being scanned alternately with each step of said predetermined sequence.

37. A storage system comprising a cathode ray tube, an electrostatic storage member within said tube, means for directing a cathode ray beam upon a surface of said storage member, scanning means to deflect said cathode ray beam recurrently along a path over said surface, auxiliary means coupled to said tube to cause said beam to scan a selected part of said path, a control circuit coupled to said auxiliary means to vary the part of said path selected for scanning, and further means operable to render said auxiliary means operative and said scanning means inoperative and to render said auxiliary means inoperative and said scanning means operative.

References Cited in the file of this patent

UNITED STATES PATENTS

| | | |
|---|---|---|
| 2,297,752 | Du Mont et al. | Oct. 6, 1942 |
| 2,436,677 | Snyder | Feb. 24, 1948 |
| 2,439,050 | Mallory | Apr. 6, 1948 |
| 2,444,338 | Dimond | June 29, 1948 |
| 2,446,945 | Morton | Aug. 10, 1948 |
| 2,454,410 | Snyder | Nov. 23, 1948 |
| 2,469,031 | Canfora | May 3, 1949 |
| 2,474,040 | Day | June 21, 1949 |
| 2,474,266 | Lyons | June 28, 1949 |
| 2,479,880 | Toulon | Aug. 23, 1949 |
| 2,487,191 | Smith | Nov. 8, 1949 |
| 2,488,297 | Lacy | Nov. 15, 1949 |
| 2,564,908 | Kuchinsky | Aug. 21, 1951 |
| 2,576,040 | Pierce | Nov. 20, 1951 |
| 2,656,485 | Page | Oct. 20, 1953 |